United States Patent [19]

Fujitani et al.

[11] Patent Number: 5,096,665
[45] Date of Patent: Mar. 17, 1992

[54] HYDROGEN ABSORBING ALLOYS HAVING MGZN$_2$-TYPE LAVES PHASE STRUCTURE

[75] Inventors: Shin Fujitani; Ikuo Yonezu, both of Osaka; Toshihiko Saito, Saito, all of Japan

[73] Assignee: Sanyo Electric Co., Ltd., Osaka, Japan

[21] Appl. No.: 475,806

[22] Filed: Feb. 6, 1990

[30] Foreign Application Priority Data

Feb. 7, 1989 [JP] Japan .................................. 1-28067

[51] Int. Cl.$^5$ ................................................ C01B 6/02
[52] U.S. Cl. ...................... 420/422; 423/644; 420/900
[58] Field of Search ................. 420/422, 900; 423/644

[56] References Cited

U.S. PATENT DOCUMENTS

| | | | |
|---|---|---|---|
| 4,163,666 | 8/1979 | Shaltiel et al. | 420/900 |
| 4,195,989 | 4/1980 | Gamo et al. | 420/900 |
| 4,412,982 | 11/1983 | Wallace et al. | 423/644 |
| 4,668,424 | 5/1987 | Sandrock | 420/900 |
| 4,913,879 | 4/1990 | Honda et al. | 420/422 |
| 4,946,646 | 8/1990 | Gamo et al. | 420/415 |

FOREIGN PATENT DOCUMENTS

| | | | |
|---|---|---|---|
| 3151712 | 6/1984 | Fed. Rep. of Germany | 420/900 |
| 1270362 | 11/1986 | Japan | 420/900 |

Primary Examiner—Upendra Roy
Attorney, Agent, or Firm—Darby & Darby

[57] ABSTRACT

Alloys having the composition $Zr(Mn_{1-x}Co_x)_yAl_zA_w$ are formed by adding rare-earth metals such as La, Ce, and Mm and the like or V to a Zr-Mn-Co-Al quaternary alloy, where A is at least one of rare-earth metals such as La, Ce, Mm and the like or V, and the amount x of Co substituent is the range $0<x<0.5$; stoichiometric ratio y for (Mn+Co)/Zr, in $1.7<y<2.3$; the amount z of Al added, in $0<z<0.15$; and the amount w of A added, in $0<w<0.4$. The alloys thus formed turn out to be hydrogen absorbing alloys having small absorption-disorption heat difference and long lives, yet maintaining the properties of the quaternary alloy.

2 Claims, 4 Drawing Sheets

1 ZrMnCoAl$_{0.1}$La$_w$
2 ZrMnCoAl$_{0.1}$Ce$_w$
3 ZrMnCoAl$_{0.1}$V$_w$
4 ZrMnCoAl$_{0.1}$(V$_{0.5}$Ce$_{0.5}$)$_w$

HYDROGEN ABSORBING ALLOYS HAVING MGZN$_2$-TYPE LAVES PHASE STRUCTURE

FIELD OF THE INVENTION

The invention relates to hydrogen absorbing alloys that are capable of absorbing and desorbing hydrogen reversibly.

BACKGROUND OF THE INVENTION

In recent years there have been developed a variety of systems utilizing hydrogen absorbing alloys that can reversibly absorb and desorb hydrogen. Among them are, for example, (a) heat utilization systems such as heat storage systems and heat pumps which use the reaction heat involved in hydrogen absorption and desorption, and (b) hydrogen absorbing systems which take advantage of such alloys to absorb a large amount of hydrogen.

Major necessary conditions for a hydrogen absorbing alloy to be used in such systems are that:
  (1) Activation is easy in the initial stage of hydriding reactions;
  (2) The alloy has a moderate hydrogen absorption and a desorption pressure at a given operating temperature;
  (3) The difference between the hydrogen absorption and desorption pressures during a reversible absorption-desorption process is small;
  (4) The difference between the heat involved in hydrogen absorption and desorption is small;
  (5) The life time or durability of the alloy is long when used as a hydrogen absorbing alloy;
  (6) The alloy has a great hydrogen absorption capacity;
  (7) Raw materials are available at low cost.

Hydrogen absorbing alloys satisfying these conditions other than (4) and (5) have been proposed by the present inventors in Japanese Patent Application No. 62-252351, which discloses Zr-Mn-Co-Al quaternary alloy systems suitable for use in thermal utilization systems in a most usable temperature range, i.e. 100° C.-200° C.

Said hydrogen absorbing alloys made from the quaternary alloy excel other rare-earth-Ni systems, Ti-Fe systems, Zr-Mn systems, and Mg systems in property in the temperature range 100° C-200° C in that the quaternary systems have properties not found in the latter systems.

Yet the quaternary systems needed further improvements from the points of important requirement (4) for efficiency and (5) for durability. Regarding the condition (4), in particular, they exhibited greater hysteresis at lower temperatures. More specifically, improvement has been looked for to overcome such disadvantage encountered especially when they are to be utilized for transportation systems used over a wide temperature range.

BRIEF SUMMARY OF THE INVENTION

An object of the invention is to provide a hydrogen absorption alloy that has a small difference between the heat involved in hydrogen absorption and desorption, and has great durability or a long cycle life, by improving the properties of said Zr-Mn-Co-Al quaternary alloy systems.

The hydrogen absorbing alloys according to the invention is characterized in that they are obtained from ZrMn$_2$ alloy having MgZn$_2$-type Laves-phase structure by partial substitution of Co for the Mn and by adding thereto Al and said rare-earth metal such as La, Ce, Mm or V, and that the alloys have composition $Zr(Mn_{1-x}Co_x)_yAl_zA_w$ (where A is at least one of rare-earth metals such as La, Ce, Mm, etc., or V). In this case it is desirable to have the amount x of Co substituent is in the range $0<x<0.5$; stoichiometric ratio y for (Mn+Co)/Zr, in $1.7<y<2.3$; the amount z of Al added, in $0<z<0.15$; and the amount w of A added, in $0<w<0.4$.

The addition of an element or elements, e.g. V, to said Zr-Mn-Co-Al quaternary alloy helps getting a more parallel van't Hoff plot, i.e. making said heat differences smaller, without losing the desirable properties of Zr-Mn-Co-Al quaternary alloy.

The cycle life or durability is also greatly improved compared with conventional alloys. If, instead of or in addition to V, a rare-earth metal such as La, Ce, and Mm etc. is added, said reaction heat difference is not only further reduced but also the cycle durability is further improved.

The hydrogen absorbing alloys according to the invention may thus provide a more efficient and durable thermal utilization system usable in a most usable temperature range of 100° C.-200° C.

DETAILED DESCRIPTION OF THE PREFERRED EMBODIMENT

Embodiment 1

Proper amounts of Zr, Mn, Co, and Al powders to be used as material metals for the hydrogen absorbing alloys were measured, which were then mixed and pressed into appropriately sized aggregates, which were melt in water-cooled copper molds by means of argon arc and cast into metal blocks having compositions of:
  (a) $ZrMn_{1.6}Co_{0.4}Al_{0.1}V_{0.05}$;
  (b) $ZrMn_{1.6}Co_{0.4}Al_{0.05}$;
  (c) $ZrMn_{1.6}Co_{0.4}Al_{0.1}Mm_{0.05}$;
  (d) $ZrMn_{1.6}Co_{0.4}Al_{0.1}(V_{0.5}Ce_{0.5})0.05$;
  (e) $ZrMn_{1.6}Co_{0.4}Al_{0.1}(V_{0.5}Mm_{0.5})0.5$.

These blocks were then crushed through a mesh of about 100 to obtain a powder hydrogen absorbing alloys having different compositions (a)–(e) above.

The crystalline structures of these hydrogen absorbing alloys were found, through X-ray powder diffractometry, to be all $MgZn_2$-type Laves-phase single phase structure.

The initial activation of these alloys was easy and they promptly started hydrogen absorption at room temperature in a pressurized pure hydrogen atmosphere of 10–20 atm.

In order to compare these characteristic properties of the hydrogen absorbing alloys with those of conventional hydrogen absorbing alloys, the following alloys were made.

Comparing Alloys

Hydrogen absorbing alloy $ZrMn_{1.6}Co_{0.4}Al_{0.1}$ was made from a powder mixture Of material metals Zr, Mn, Co, and Al in the same manner as for the Embodiment 1 except that none of V, La, Ce or Mm was used.

Using a well known Sieverts apparatus the amount of the hydrogen absorbed by the alloys of Embodiment 1 and the comparing alloys was measured as a function of equilibrium hydrogen pressure at 100° C and 150° C. Based on these measurements van't Hoff plots were made (showing the relationship between the equilibrium hydrogen pressure and the inverse of absolute temperature), the slopes of which give the reaction heats pertinent to hydrogen absorption and desorption. The hydrogen absorption/desorption cycle durability of samples was also estimated through repeated temperature raising and lowering.

Figure 1:
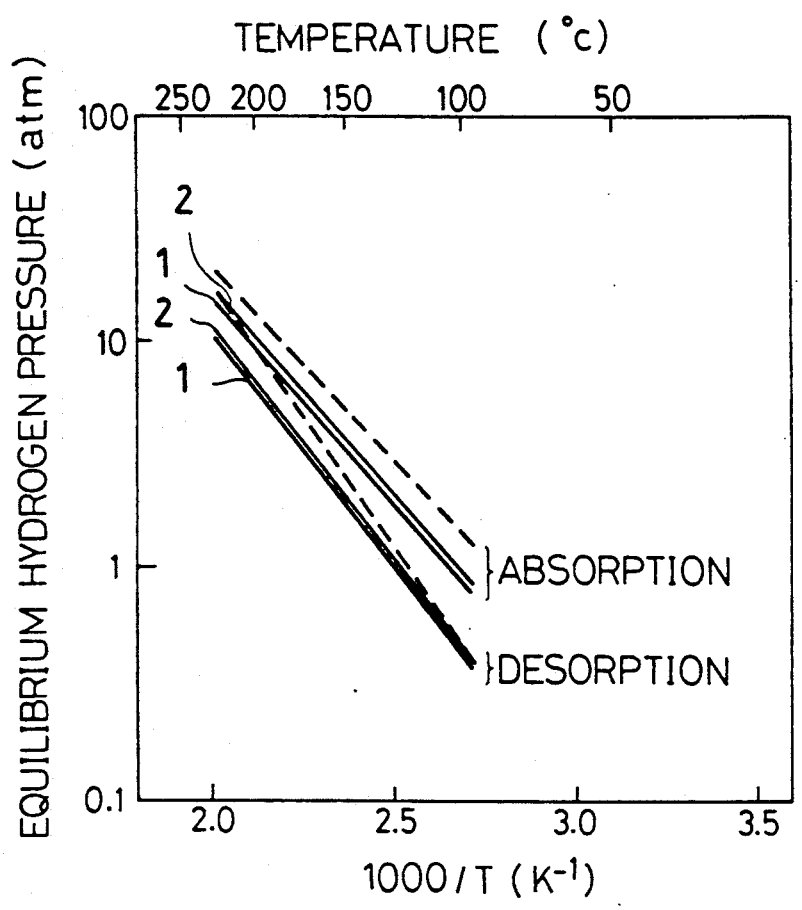
FIG. 1 compares van't Hoff plots for one of the hydrogen absorbing alloys of Embodiment 1 with that for a reference alloy.
Figure 2:
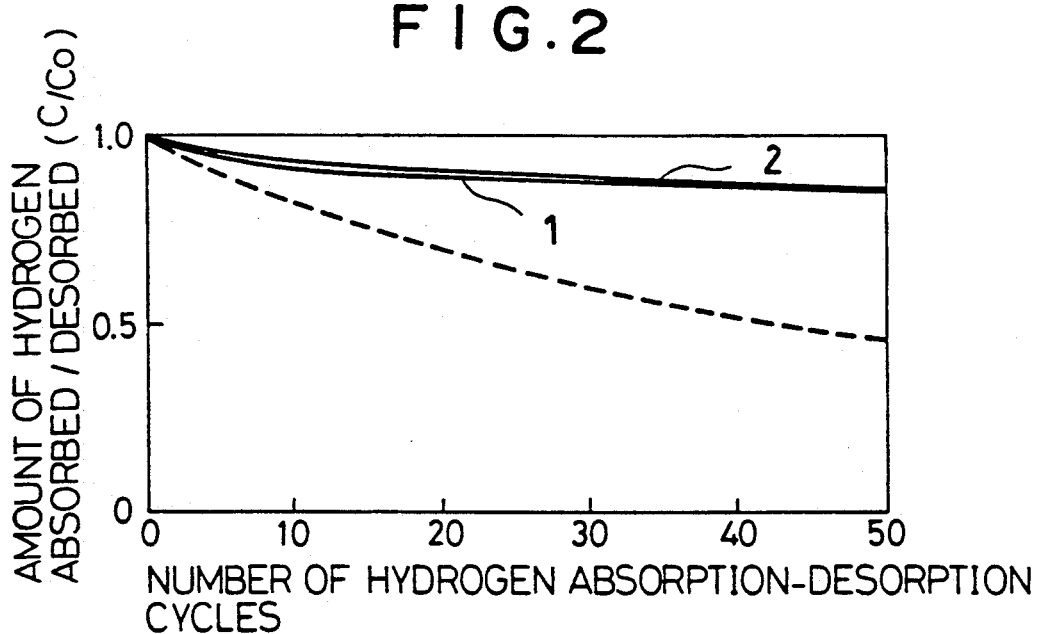
FIG. 2 compares the hydrogen absorption-desorption cycle durability for the alloys shown in FIG. 1.
Figure 3:
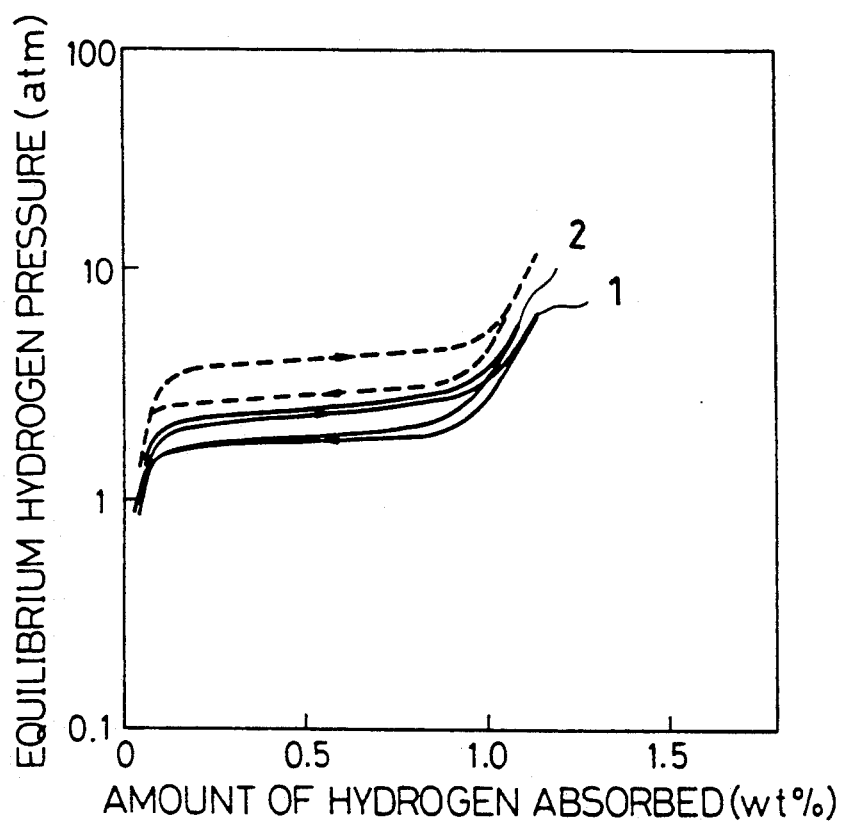
FIG. 3 shows hydrogen absorption/deposition isotherms for the alloys shown in FIG. 1.

FIG. 1 shows the above mentioned van't Hoff plots; FIG. 3, hydrogen absorption/desorption isotherms as a function of the hydrogen pressure; FIG. 2, the hydrogen absorption/desorption characteristics in terms of the amount of hydrogen absorbed/desorbed as observed in repetitive cycles. Table 1 summarizes the data obtained in the measurments.

In all these figures solid lines ① refer to $ZrMn_{1.6}Co_{0.4}Al_{0.1}V_{0.05}$ alloy, while solid lines ② refer to $ZrMn_{1.6}Co_{0.4}Al_{0.1}(V_{0.5}Ce_{0.5})_{0.05}$ alloy and the broken lines refer to the comparing $ZrMn_{1.6}Co_{0.4}Al_{0.1}$ alloy.

TABLE 1

| Alloys | Heat difference (between hydrogen adsorption and desorption in Kcal/mol $H_2$) | Cycle life (decrease in hydrogen amount for 50 cycles) | HS value* for 0.7 wt % | Maximum** hydrogen amount (wt %) | Remarks |
| --- | --- | --- | --- | --- | --- |
| $ZrMn_{1.6}Co_{0.4}Al_{0.1}$ | 2.5 | 55% | 0.6 | 1.1 | Comparing alloy |
| $ZrMn_{1.6}Co_{0.4}Al_{0.1}V_{0.05}$ | 1.6 | 14% | 0.6 | 1.2 | Alloys of Embodiment 1 |
| $ZrMn_{1.6}Co_{0.4}Al_{0.1}La_{0.05}$ | 2.1 | 7% | 0.6 | 1.2 | Alloys of Embodiment 1 |
| $ZrMn_{1.6}Co_{0.4}Al_{0.1}Mm_{0.05}$ | 2.0 | 7% | 0.6 | 1.1 | Alloys of Embodiment 1 |
| $ZrMn_{1.6}Co_{0.4}Al_{0.1}(V_{0.5}Ce_{0.5})_{0.05}$ | 1.9 | 6.5% | 0.6 | 1.05 | Alloys of Embodiment 1 |
| $ZrMn_{1.6}Co_{0.4}Al_{0.1}(V_{0.5}Mn_{0.5})_{0.05}$ | 1.9 | 6.5% | 0.6 | 1.05 | Alloys of Embodiment 1 |

*HS value represents the natural logarithmic difference in the hydrogen pressure for reversible adsorption and desorption of a predetermined amount of hydrogen (of 0.7 wt %) at 150° C.
**This represents the maximum amount of hydrogen absorbed at 150° C. and 15 atm.

Comparison of the alloys $ZrMn_{1.6}Co_{0.4}Al_{0.1}V_{0.05}$ and $ZrMn_{1.6}Co_{0.4}Al_{0.1}(V_{0.5}Ce_{0.5})_{0.05}$ of Embodiment 1 with the comparing alloy reveals that the alloys of Embodiment 1 have more parallel van't Hoff plots for hydrogen absorption and desorption, as seen in FIG. 1, and have less heat difference than the comparing alloy. Further, the hydrogen absorption/desorption cycle durability of the alloys of Embodiment 1 is greatly improved, as shown in FIG. 2, in which the ratio C/Co is defined by the ratio of the amount of hydrogen absorbed or desorbed to the initial amount (Co). The alloys of Embodiment 1 further have the same excellent equilibrium characteristics (i.e. flatter plateau regions, small hysteresis and small HS values) as the comparing alloy, verifying that they still maintain excellent hydrogen absorption/desorption characteristics as shown in FIG. 3.

It should be noted that, although the characteristic properties have been discussed above only for the alloys $ZrMn_{1.6}Co_{0.4}Al_{0.1}V_{0.05}$ and $ZrMn_{1.6}Co_{0.4}Al_{0.1}(V_{0.5}Ce_{0.5})$ 0.05, other alloys of Embodiment 1 also have been verified to have substantially the same excellent characteristic properties.

It should be also noted that any type of furnace such as high-frequency induction furnace may equally be used in making these alloys and not limited to argon-arc furnace used in Embodiment 1.

Although all the metal materials used in Embodiment 1 are powders of Zr, Mn, Co, Al, V, La, Ce, and Mm, it should be understood that so long as the compositions of the metal materials are known the metals may be in the form of pure metals or alloys, or mixtures of them, e.g. a mixture of powdered Co, Al, V, La, Ce, Mm and powdered $ZnMn_2$ alloy.

Embodiment 2

Following the same manner as in Embodiment 1, hydrogen absorbing alloys having the composition $Zr(Mn_{1-x}Co_x)_2Al_{0.1}V_{0.05}$ and $Zr(Mn_{1-x}Co_x)_2Al_{0.1}(V_{0.05}$ and $Zr(Mn_{1-x}Co_x)_2Al_{0.1}(V_{0.5}Ce_{0.5})_{0.05}$ respectively, were made from Zr, Mn, Co, Al, V, and Ce powders with different values of x of Co substituent. The characteristic properties of these alloys were studied for different values of x.

Like alloys of Embodiment 1 these hydrogen absorbing alloys also have a $MgZn_2$ type Laves-phase single-phase structure. Their initial activation was easy at room temperature: namely, they promptly started hydrogen absorption in a pure pressurized hydrogen atmosphere of 10–20 atm.

Figure 4:
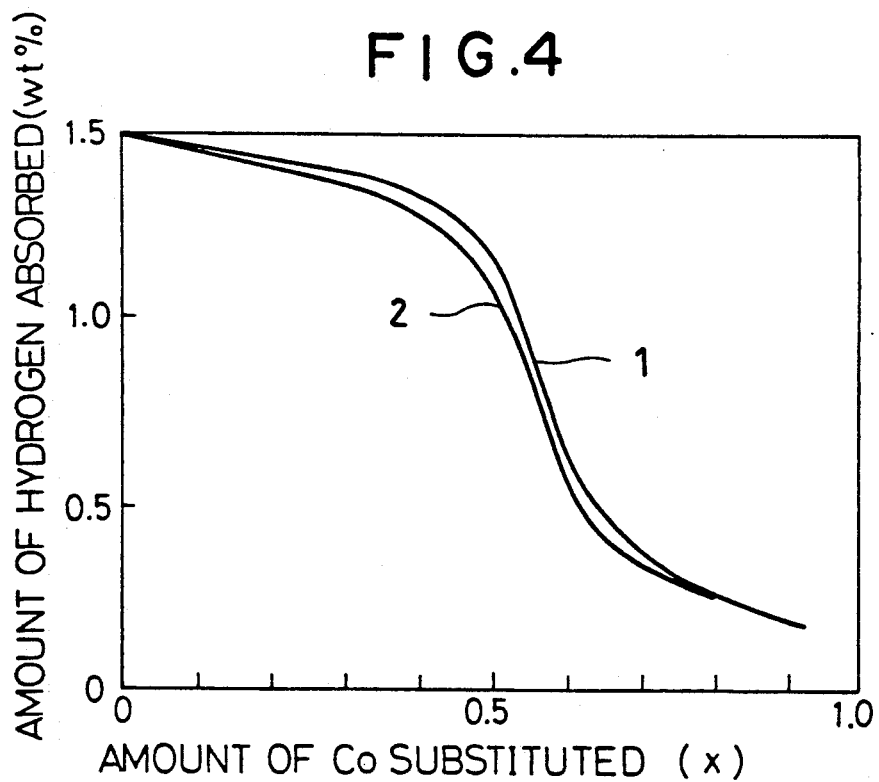
FIG. 4 shows the relationship between the amount x of the Co substituent and the amount of the hydrogen absorbed for alloys of Embodiment 2.

FIG. 4 shows the relationship between the amount x of the Co substituent and the amount of the hydrogen absorbed under 10 atm at room temperature. The figure shows that the amount of the hydrogen absorbed sharply decreases as x exceeds 0.5.

Thus, in order to maintain the amount of the hydrogen absorbed at or more than practical usable level of 1 wt%, it is preferable to have the amount x of Co substituent in the range $0<x<0.5$.

Embodiment 3

Following the manner used in Embodiment 1, hydrogen absorbing alloys having the composition $Zr(Mn_{0.8}Co_{0.2})_yAl_{0.1}V_{0.05}$ and $Zr(Mn_{0.8}Co_{0.2})_yAl_{0.1}(V_{0.05}Ce_{0.5})_{0.05}$, respectively, were made from Zr, Mn, Co, Al, V, and Ce powders with different stoichiometric ratios y of (Mn+Co) to Zr by varying the relative amounts of Zr and (Mn +Co).

All of these alloys were found in X-ray powder diffractometry to have crystalline structure of $MgZn_2$ Laves-phase single-phase structure, and that their initial activation was easy at room temperature: namely they promptly started hydrogen absorption in a pressured atmosphere of 10–20 atm, in just the same manner as in Embodiment 1.

Figure 5:
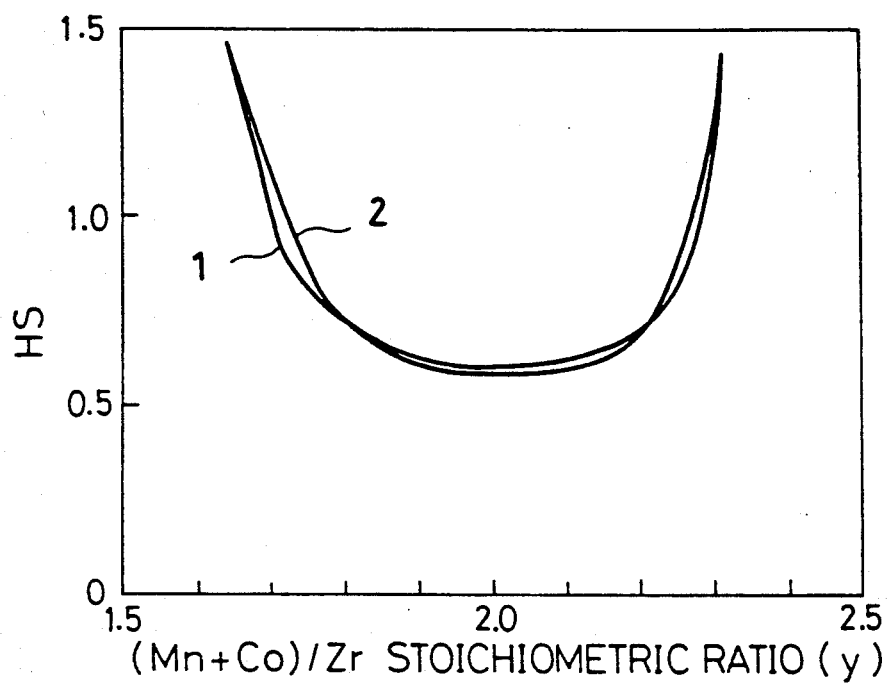
FIG. 5 shows the relationship between the stoichiometric ratio y of (Co +Mn) and HS value for alloys of Embodiment 3, where HS value represents the natural logarithmic difference in the hydrogen pressure for reversible absorption and desorption of a predetermined amount of hydrogen.

Absorption/desorption characteristics of these alloys were studied, from which we have obtained the relationship as shown in FIG. 5 between the stoichiometric ratio y and the pressure difference HS (in natural logarithm) observed in reversible absorption/desorption of 0.7 wt% of hydrogen.

We see from this FIG. that the pressure difference HS increases sharply with the stoichiometric ratio y if y is less than 1.7 or greater than 2.3. It was found that this is due to the increase in steepness of the plateau for y<1.7, and due to the increase in steepness of the plateau and the decrease in the amount of the hydrogen absorbed for y>2.3.

Thus, in order to maintain HS value below acceptable level of 1, it is preferable to have the stoichiometric ratio y for (Mn+Co)/Zr in the range $1.7<y<2.3$.

Embodiment 4

Following the manner used in Embodiment 1, hydrogen absorbing alloys having the composition $ZrMn_{1.6}Co_{0.4}Al_zV_{0.05}$ and $ZrMn_{1.6}Co_{0.04}Al_z(V_{0.5}Ce_{0.5})_{0.05}$, respectively, were made from Zr, Mn, Co, Al, V, and Ce powders with different amounts z of Al added. Their hydrogen absorption/desorption characteristics were studied.

All of these alloys were also found to have $MgZn_2$ Laves-phase single-phase crystalline structure, and that their initial activation was easy at room temperature: namely, they promptly started hydrogen absorption in a pure pressurized hydrogen atmosphere of 10–20 atm.

Figure 6:
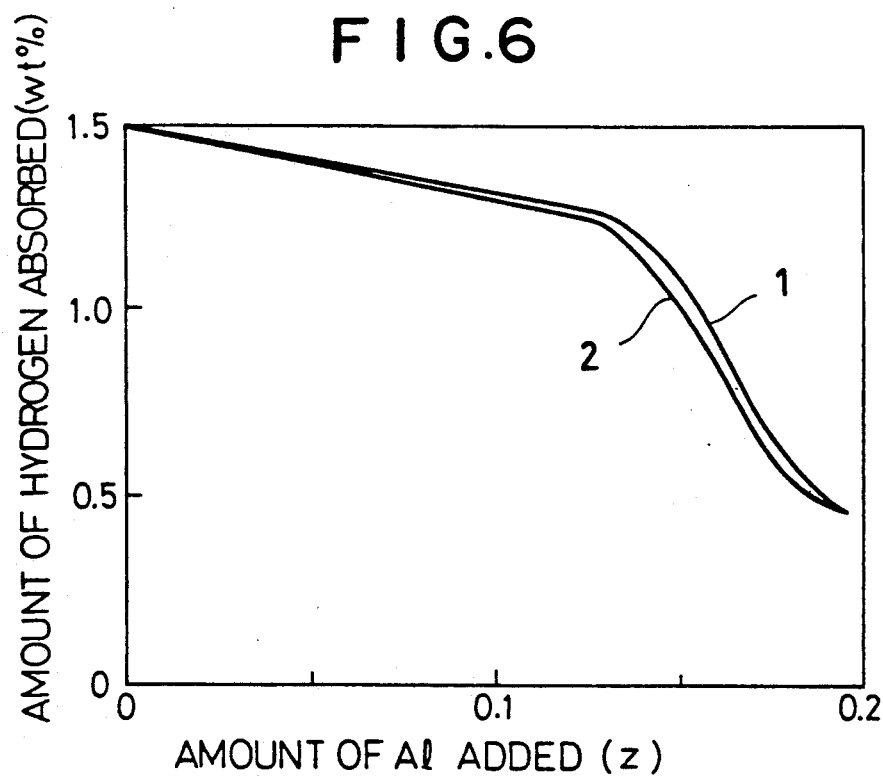
FIG. 6 shows the relationship between the amount z of the Al added and the amount of the hydrogen absorbed for alloys of Embodiment 4.

FIG. 6 shows the relationship between the amount z of Al added in the alloys $ZrMn_{1.6}Co_{0.4}Al_zV_{0.05}$ and $ZrMn_{1.6}Co_{0.4}Al_z(V_{0.05}Ce_{0.5})_{0.05}$ and the amount of the hydrogen absorbed.

Thus, in order to maintain the amount of the hydrogen absorbed to a usable level of 1 wt%, it is preferable to have the added Al amount z in the range $0<z<0.15$.

Embodiment 5

Following the manner used in Embodiment 1, hydrogen absorbing alloys having the composition $ZrMn_{1.0}Co_{1.0}Al_{0.1}A_w$ (where A is at least one of V, La, Ce, Mm, etc.) were made from Zr, Mn, Co, Al, V, La, Ce and Mm powders with different composition of V, La, Ce and Mm added, and their hydrogen absorption/desorption characteristics were studied.

All of these alloys were found in X-ray powder diffractometry to have crystalline structure of $MgZn_2$ Laves-phase single-phase structure, and that their initial activation was easy at room temperature: namely they promptly started hydrogen absorption in a pure pressurized hydrogen atmosphere of 10–20 atm, in just the same manner as in Embodiment 1.

Figure 7:
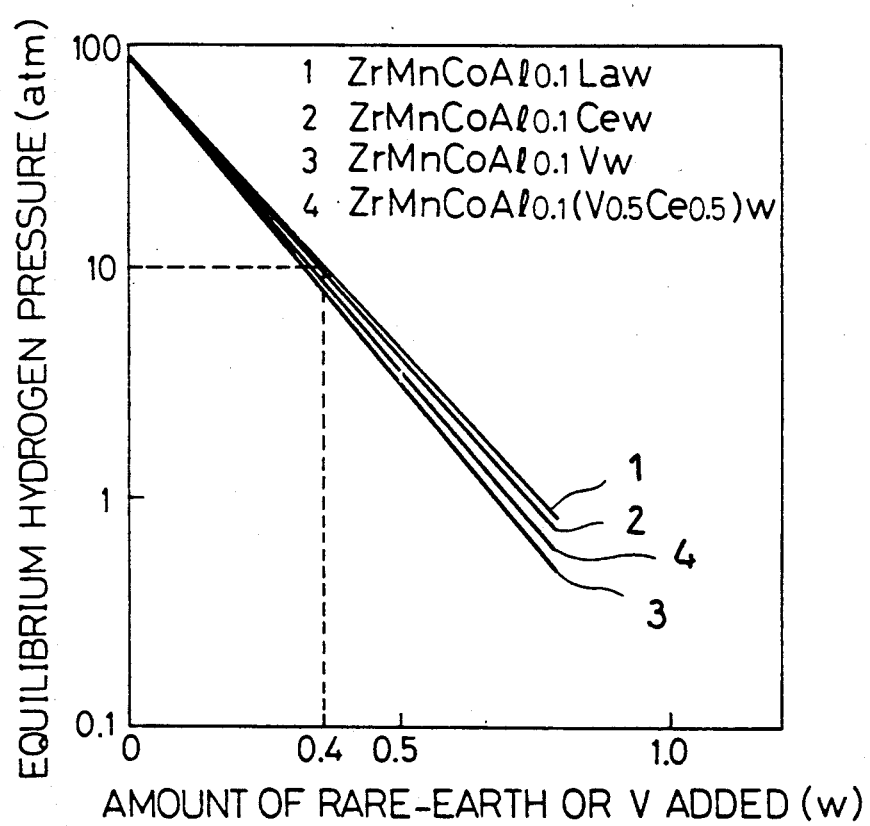
FIG. 7 shows the relationship between the amount w of added V, La, Ce or Mm and equilibrium hydrogen pressure.

FIG. 7 shows the relationship between the equilibrium hydrogen pressure and the added amount w of V, La, or Ce or $(V_{0.5}Ce_{0.5})$ of Embodiment 5, at 200° C. Assuming that the equilibrium hydrogen pressure is increased by giving the amount x of Co substituent as high as the limiting value of 0.5, the equilibrium hydrogen pressure will become less than 10 atm. if the added amount w of V, La, or Mm or $(V_{0.5}Ce_{0.5})$ exceeds 0.4, and it will be difficult then to use the alloy in the most usable temperature range of 100° C.–200° C.

Thus, it is preferable to have the amouts w of added V, La, Ce or Mm or $(V_{0.05}Ce0.5)$ in the range $0< w < 0.4$ so that the equilibrium hydrogen pressure may be maintained at the optimum pressure of 10 atm at temperature between 100° C and 200° C.

Although in this Embodiment only La, Ce, V, and $(V_{0.5}Ce_{0.5})$ have been described as the metals to be added to the Zr-Mn-Co-Al quaternary alloy, it should be clear that the metal(s) to be added according to the invention is(are) not limited to these but may be any one element or any combination of the rare-earth metals and V.

We claim:

1. Hydrogen absorbing alloys having $MgZn_2$-type Laves phase structure with its Mn partially by Co and containing, as additives, Al and V, and having the composition $Zr(Mn_{1-x}Co_x)_yAl_zV_w$ with substituted Co amount x being in the range $0<x<0.5$;

stoichiometric ratio y, (Mn+Co)/Zr, being in the range $1.7<y<2.3$;

added aluminum amount z being in the range $0<z<0.15$; and amount w of added V being in the range $0>w>0.4$.

2. Hydrogen absorbing alloys having $MgZn_2$-type Laves phase structure with its Mn partially substituted by Co and containing, as additives, Al and A, where A is V with the addition of at least one rare-earth metal such as La, C, or Mm, and having the composition $Zr(Mn_{1-x}Co_x)_yAl_zA_w$ with substituted Co amount x being in the range $0 < x < 0.5$;

stoichiometric ratio y, (Mn+Co)/Zr, being in the range $1.7 < y < 2.3$;

added aluminum amount z being in the range $0 < z < 0.15$; and amount w of added A being in the range $0 < w < 0.4$.

* * * * *